United States Patent
Biondo et al.

(10) Patent No.: US 10,738,847 B2
(45) Date of Patent: Aug. 11, 2020

(54) VENTILATED BRAKING BAND, VENTILATED BRAKE DISC AND METHOD OF VENTILATION

(71) Applicant: FRENI BREMBO S.P.A., Curno, Bergamo (IT)

(72) Inventors: Simone Biondo, Curno (IT); Stefano Medici, Curno (IT); Fabrizio Paggi, Curno (IT); Michele Donati, Curno (IT)

(73) Assignee: Freni Brembo S.p.A., Curno, Bergamo (IT)

( * ) Notice: Subject to any disclaimer, the term of this patent is extended or adjusted under 35 U.S.C. 154(b) by 5 days.

(21) Appl. No.: 16/083,073

(22) PCT Filed: Mar. 3, 2017

(86) PCT No.: PCT/IB2017/051245
§ 371 (c)(1),
(2) Date: Sep. 7, 2018

(87) PCT Pub. No.: WO2017/153873
PCT Pub. Date: Sep. 14, 2017

(65) Prior Publication Data
US 2019/0063526 A1 Feb. 28, 2019

(30) Foreign Application Priority Data
Mar. 7, 2016 (IT) .......................... 102016000023597

(51) Int. Cl.
*F16D 65/12* (2006.01)
*F16D 65/02* (2006.01)

(52) U.S. Cl.
CPC .... *F16D 65/128* (2013.01); *F16D 2065/1308* (2013.01); *F16D 2065/1328* (2013.01)

(58) Field of Classification Search
CPC ............. F16F 65/128; F16F 2065/1328; F16F 65/0006; F16F 2065/1308
(Continued)

(56) References Cited

U.S. PATENT DOCUMENTS 5,526,905 A 6/1996 Shimazu et al.
9,255,617 B2 * 2/2016 Ronchi ............... F16D 65/0006
(Continued)

FOREIGN PATENT DOCUMENTS

DE 7603818 U1 6/1976
DE 2637493 A1 3/1978
(Continued)

OTHER PUBLICATIONS

European Patent Office, International Search Report with Written Opinion issued in PCT/IB2017/051245 dated Sep. 14, 2017, 13 pages, European Patent Office, Rijswijk, Netherlands.

*Primary Examiner* — Pamela Rodriguez
(74) *Attorney, Agent, or Firm* — Marshall & Melhorn, LLC (57) ABSTRACT

A ventilated braking band for ventilated brake disc, unusually capable of an efficient cooling and structural resistance, has a first plate and a second plate. The ventilated braking band has protrusions which project from a plate without reaching the other plate. Some of the protrusions which project from one of the first or second plate form a protrusion group. The protrusion group forms a continuous or interrupted protrusion group path. The protrusion group projects from both plates, thus forming at least a first and a second protrusion group path. The projections of the first and second protrusion group path cross one another on a plane parallel to the first or second braking surface of the respective plates.

10 Claims, 8 Drawing Sheets

(58) Field of Classification Search
USPC .............................. 188/264 A, 264 R, 218 R
See application file for complete search history.

(56) References Cited

U.S. PATENT DOCUMENTS

2008/0067018 A1    3/2008  Smith
2017/0002879 A1*   1/2017  Maronati .............. F16D 65/128

FOREIGN PATENT DOCUMENTS

| DE | 4040423 A1 | 7/1992 |
|----|---|---|
| DE | 4332693 A1 | 3/1995 |
| DE | 19925003 A1 | 12/2000 |
| DE | 10157284 A1 | 6/2003 |
| DE | 102004056645 A1 | 6/2006 |
| DE | 202006017092 U1 | 1/2007 |
| DE | 102012024298 A1 | 12/2013 |
| DE | 102013210700 A1 | 12/2014 |
| EP | 1907722 B1 | 12/2008 |
| EP | 2192321 A1 | 6/2010 |
| GB | 2060796 A | 5/1981 |
| GB | 2116654 A | 9/1983 |
| GB | 2282197 A | 3/1995 |
| GB | 2286438 A | 8/1995 |
| WO | 2008078352 A1 | 7/2008 |
| WO | 2008136032 A2 | 11/2008 |
| WO | 2011058594 A1 | 5/2011 |
| WO | 2012164465 A1 | 12/2012 |
| WO | 2013040606 A1 | 3/2013 |
| WO | 2015092671 A1 | 6/2015 |

* cited by examiner

VENTILATED BRAKING BAND, VENTILATED BRAKE DISC AND METHOD OF VENTILATION

FIELD OF THE INVENTION

The present invention relates to a ventilated braking band for a ventilated brake disc, as well as to a ventilated brake disc comprising said ventilated braking band.

A generic brake disc generally defines a system of cylindrical coordinates comprising an axial direction (A-A) coinciding with the axis of rotation of the brake disc, a radial direction (R-R) orthogonal to the axial direction, and a tangential or circumferential direction (C-C) orthogonal both to the axial direction (A-A) and to the radial direction (R-R).

BACKGROUND ART

Brake discs of the ventilated type are generally known, i.e. comprising a ventilated braking band which comprises two plates on which opposite braking surfaces are obtained suitable for acting in conjunction with opposite brake pads of a brake caliper which can be associated with the brake disc to exert the braking action, in which said two plates are spaced apart in axial direction, thus delimiting a gap.

Ventilated brake discs are provided with a plurality of axial connecting elements such as fins or pegs, which structurally connect said two plates to each other, thus forming said gap in conjunction with the two plates.

For example, this type of brake disc is known from International Patent Applications Nos. WO2011058594 and WO2012164465 of the same Applicant. Other examples are known from GB2286438 and GB2060796, GB2116654, DE102012024298, DE4332693, WO2008078352, EP2192321, DE202006017092, DE102004056645, DE19925003 and U.S. Pat. No. 5,526,905.

This type of brake disc has the advantage that the variously shaped connecting elements of the braking band delimit a plurality of ventilation channels in the gap between the plates, which are suitable for conveying a fluid current for cooling the brake disc when the brake disc rotates. The fins and pegs are alternated with protrusions mainly in order to provide improved cooling efficiency.

The need is strongly felt to cool the brake disc quickly and efficiently, and the contrasting need simultaneously is felt to lighten the brake disc, given that the disc is a non-suspended mass, as well as the contrasting need to maintain an adequate structural resistance which avoids the occurrence of fatigue cracks caused both by several thermal transients and by the braking actions.

In particular, it is important for the fluid current to be inside the gap during turbulent operation in order to maximize the cooling.

Moreover, in particular, temperatures of the brake disc which are too high cause a decreased efficiency of the braking action and simultaneously may cause the occurrence of thermal cracks in the body of the brake disc itself.

Solutions are known which have attempted to resolve these contrasting needs. For example, International Patent Application No. WO2015092671 of the same Applicant shows a ventilated brake disc comprising connecting elements between the two plates with which connecting protrusions or fitting burrs are associated, which extend from the connecting elements thus connecting them to the plates.

Other solutions are known from WO2008136032, DE102013210700, GB2282197, DE4332693, DE19925003, DE4040423, DE7603818U1, DE10157284 and DE2637493.

Although they are partly advantageous in reducing the occurrence of thermal cracks in the body of the brake disc, such solutions in any case have certain drawbacks.

Indeed, although the provision of said connecting burrs increases the turbulence of the cooling fluid current and the heat exchange surface of the connecting elements, it does not necessarily increase the volume, and therefore the weight, of the connecting elements themselves and of the whole brake disc. Accordingly, in order to ensure the structural integrity of the brake disc when it is in operating conditions, the above-mentioned increase in weight imposes making connecting elements, such as fins or pegs, having a particularly fat cross section, for example diamond-shaped, as is clearly apparent for example, from the fin cross-sections shown in FIGS. 2, 4, 5 and 6 of document No. WO2015092671. Additionally, as is known, the weight of the brake disc is directly proportional with the inertia of the brake disc during the braking.

The need is therefore strongly felt to obviate the drawbacks of the known art mentioned hereto.

Therefore, the need is felt to provide a structurally resistant ventilated brake disc while allowing the possibility of making lightweight and thin connecting elements, thus simultaneously facilitating the heat exchange and the formation of turbulent flows.

Solution

It is an object of the present invention to obviate the drawbacks of the prior art mentioned hereto.

It is a further object of the present invention to provide a solution of ventilated braking band as well as of ventilated brake disc suitable for causing, in the gap between the plates when said brake disc is rotating, a turbulent fluid current for disposing of the heat from the brake disc.

It is a further object of the present invention to provide a ventilated braking band as well as a ventilated brake disc having increased heat exchange surface with respect to known solutions, mass being equal, or having decreased weight, heat exchange surface being equal.

It is a further object of the present invention to provide a ventilated braking band as well as a ventilated brake disc which, although it is structurally resistant, allows to make connecting elements such as lightweight fins or pegs, and possibly allows to make thin plates.

It is a further object of the present invention to provide a ventilated braking band as well as a ventilated brake disc of the ventilated type suitable for exerting a prompt braking when clamped between the brake pads of a brake caliper.

These and other objects are achieved with a ventilated braking band according to claim 1, as well as with a ventilated brake disc according to claim 10.

Certain advantageous embodiments are the object of the dependent claims.

Due to the solutions proposed, and due in particular to the protrusions proposed, the functionality is obtained of opening windows in the ventilation ducts of the gap and simultaneously creating roughness to modify the air flow to be streamlined to turbulent with the subsequent increase of the heat exchange coefficient without penalizing the flow rate, thus allowing a drastic reduction of the operating temperature of the brake disc.

Such protrusions also serve to block/delay the propagation of the crack inside the ventilation channel, a crack caused not only by the cyclical braking stress, but also by the cyclical thermal stress. This allows results of crack resistance to be achieved with even smaller plate thicknesses with respect to known discs of equal weight or accordingly, heat efficiency being equal, brake discs weighing less than known discs.

FIGURES

Further features and advantages of the assembly according to the invention will appear in the description below of its preferred, non-limiting example embodiments, with reference to the accompanying drawings, in which.

DESCRIPTION OF SOME PREFERRED EMBODIMENTS

Figure 1:
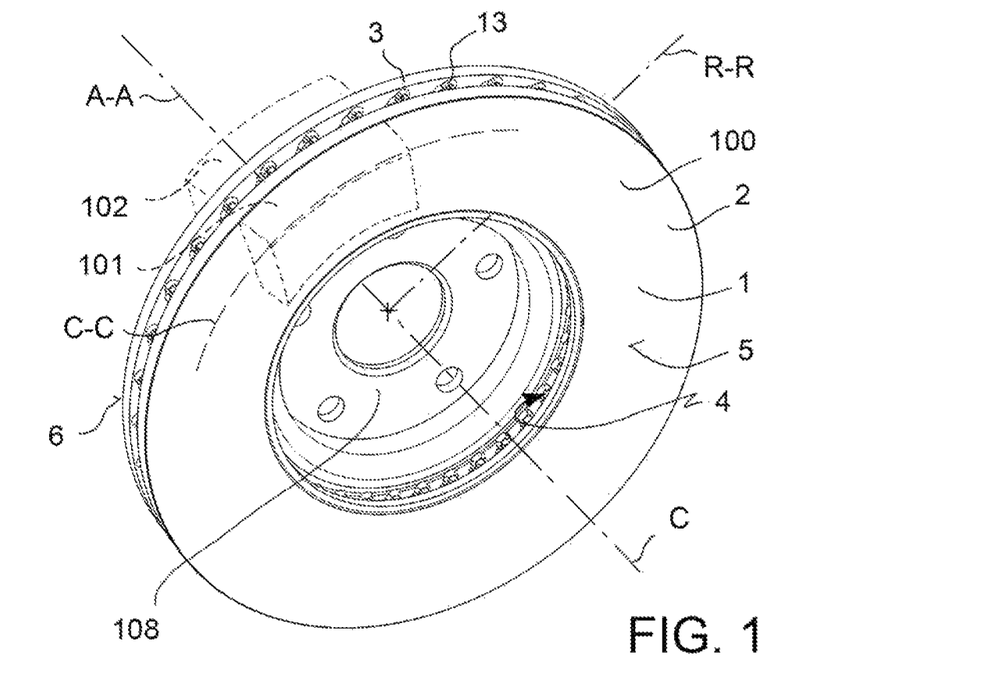
FIG. 1 depicts an axonometric view of a ventilated disc.
Figure 2:
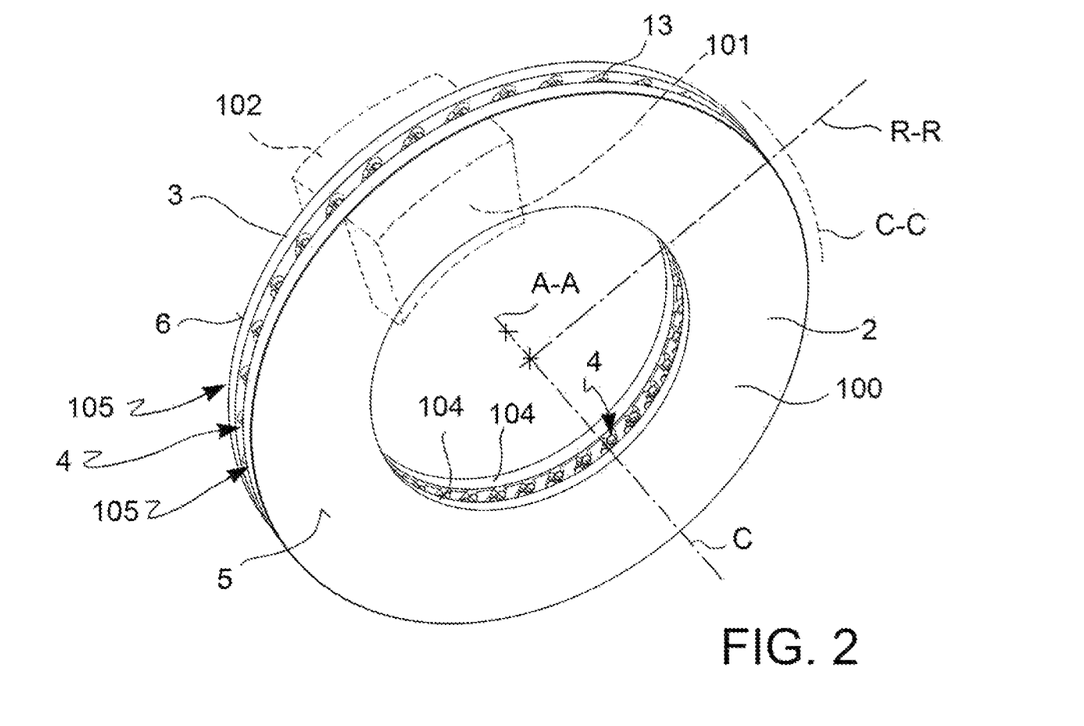
FIG. 2 depicts an axonometric view of a ventilated braking band.
Figure 3:
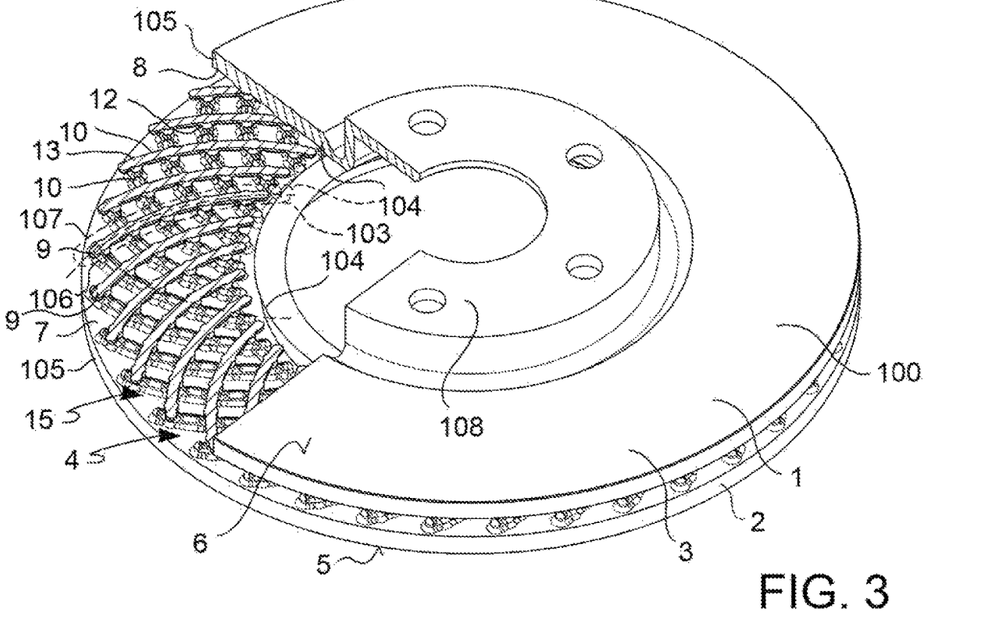
FIG. 3 depicts an axonometric view of the disc in FIG. 1 according to a first embodiment, partially cross sectioned along a plane parallel to a braking surface, arranged inside the gap and substantially slightly displaced from the inner surface of the sectioned plate.
Figure 4:
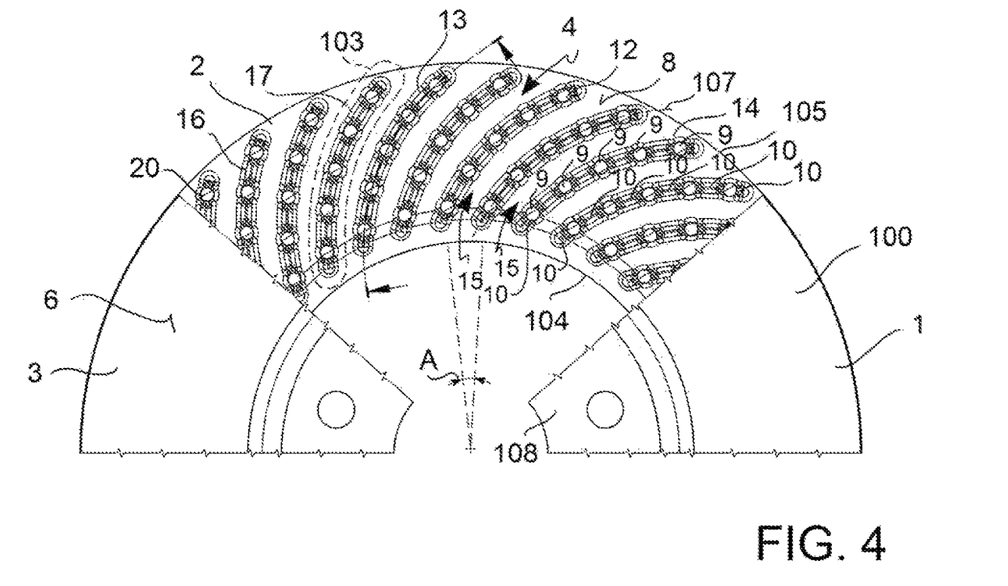
FIG. 4 depicts an axial view of the disc in FIG. 3, partially cross sectioned on a plane coinciding with the gap middle plane.
Figure 5:
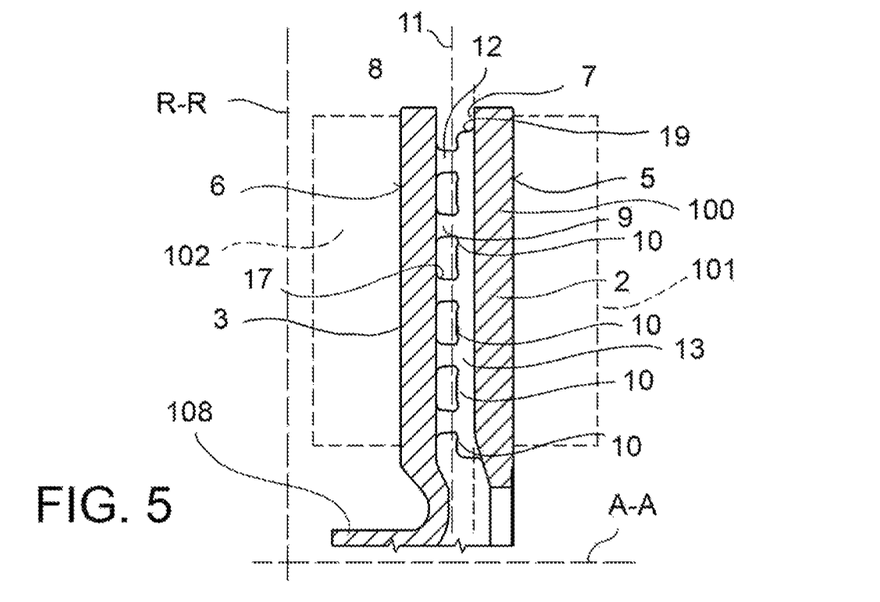
FIG. 5 shows the local section of the disc in FIG. 4, according to line V-V in FIG. 4.
Figure 6:
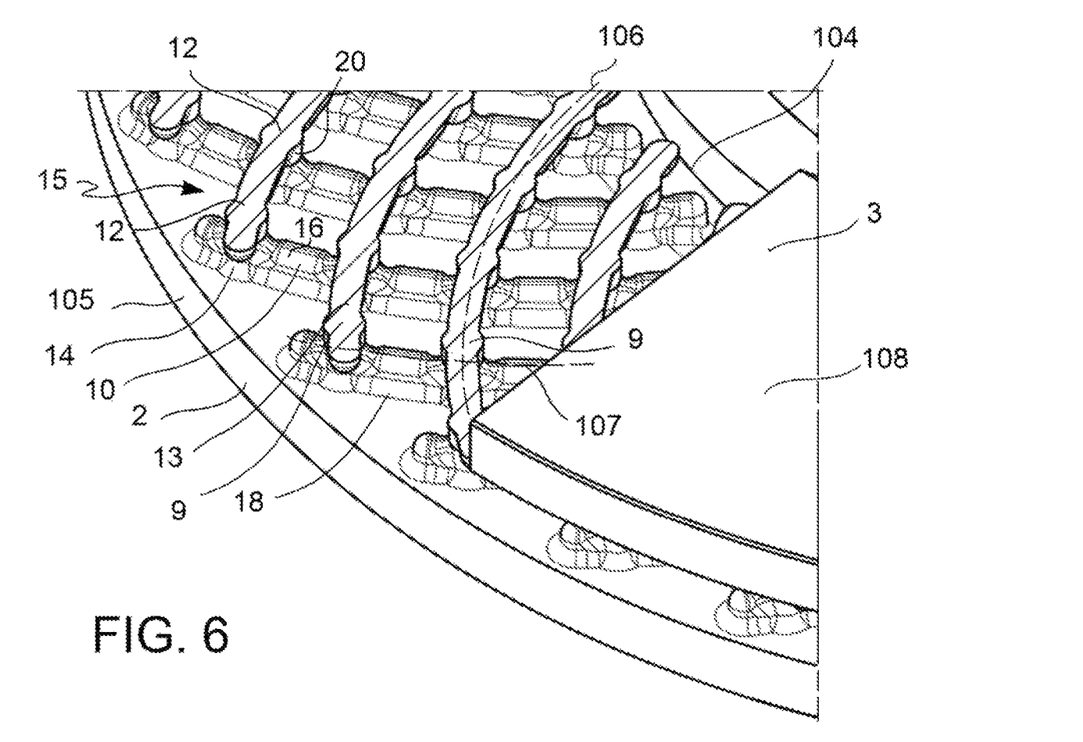
FIG. 6 shows a partially cross-sectioned axonometric view of a detail of the disc in FIG. 3.
Figure 7:
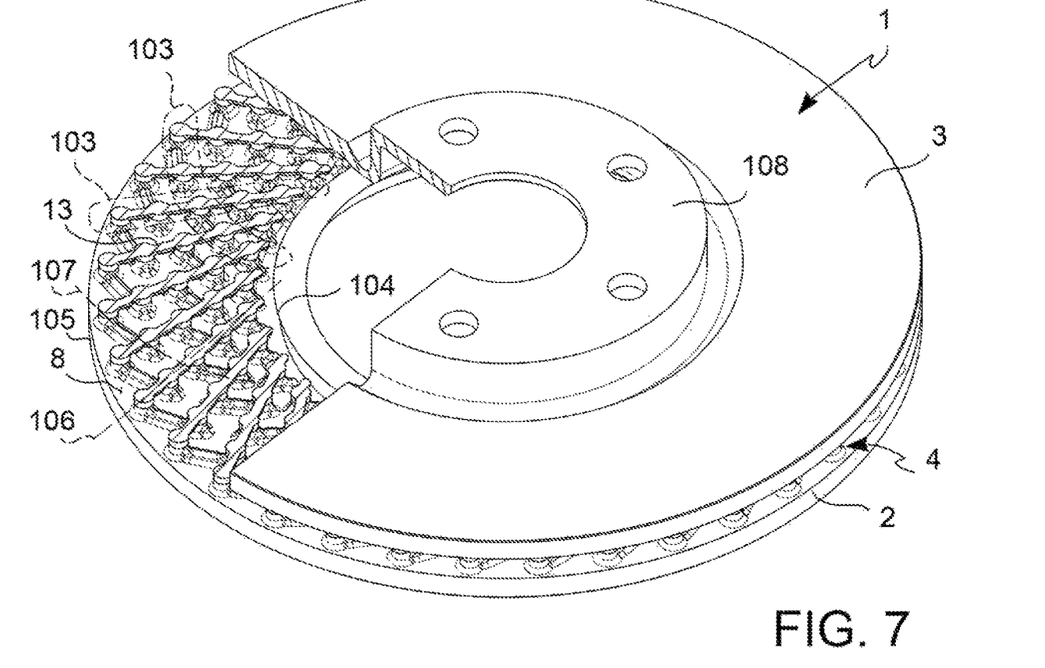
FIG. 7 depicts an axonometric view of a ventilated disc according to a second embodiment, partially cross sectioned along a plane parallel to a braking surface, arranged inside the gap and substantially slightly displaced from the inner surface of the sectioned plate.
Figure 8:
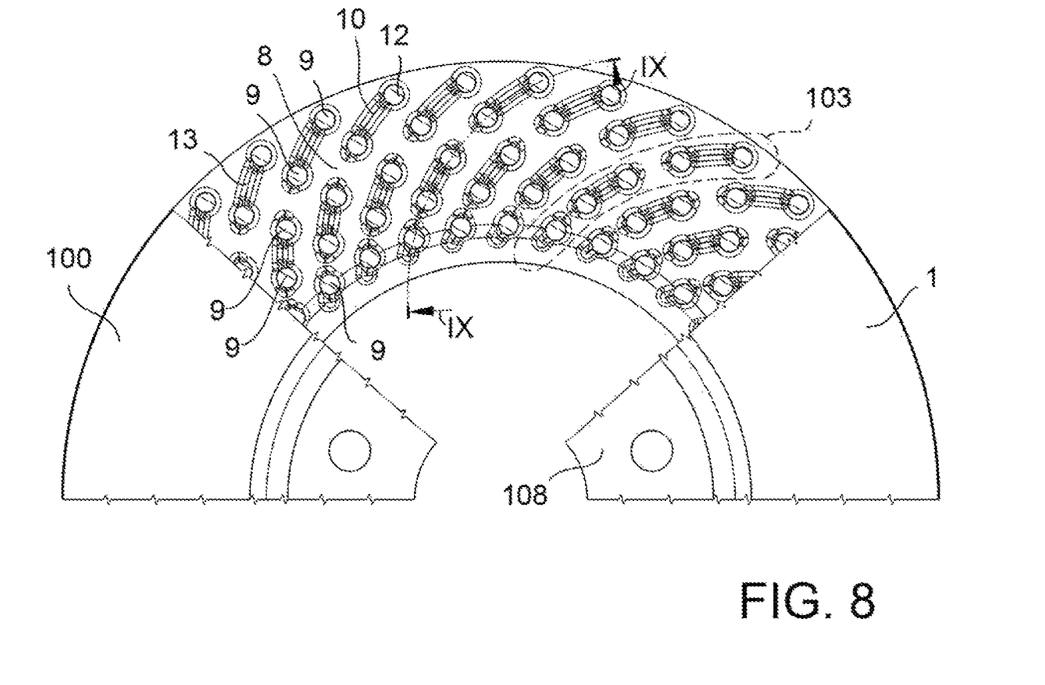
FIG. 8 depicts an axial view of the disc in FIG. 7, partially cross sectioned on a plane coinciding with the gap middle plane.
Figure 9:
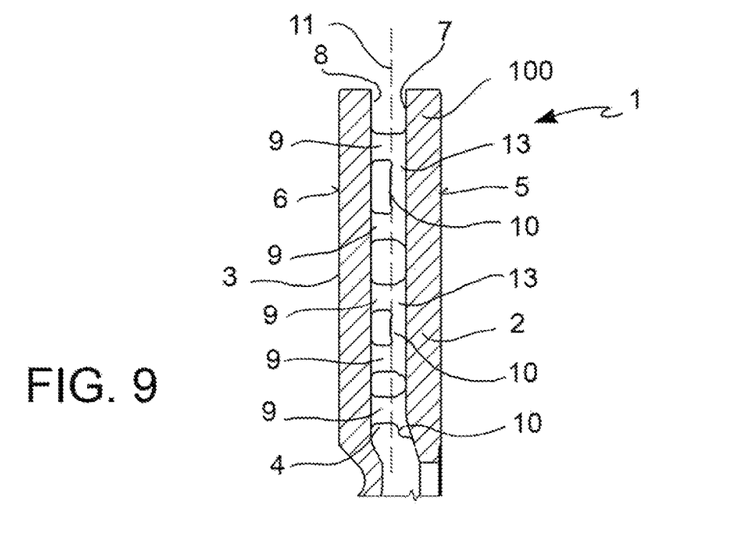
FIG. 9 shows the local section of the disc in FIG. 8, according to line IX-IX in FIG. 8.
Figure 10:
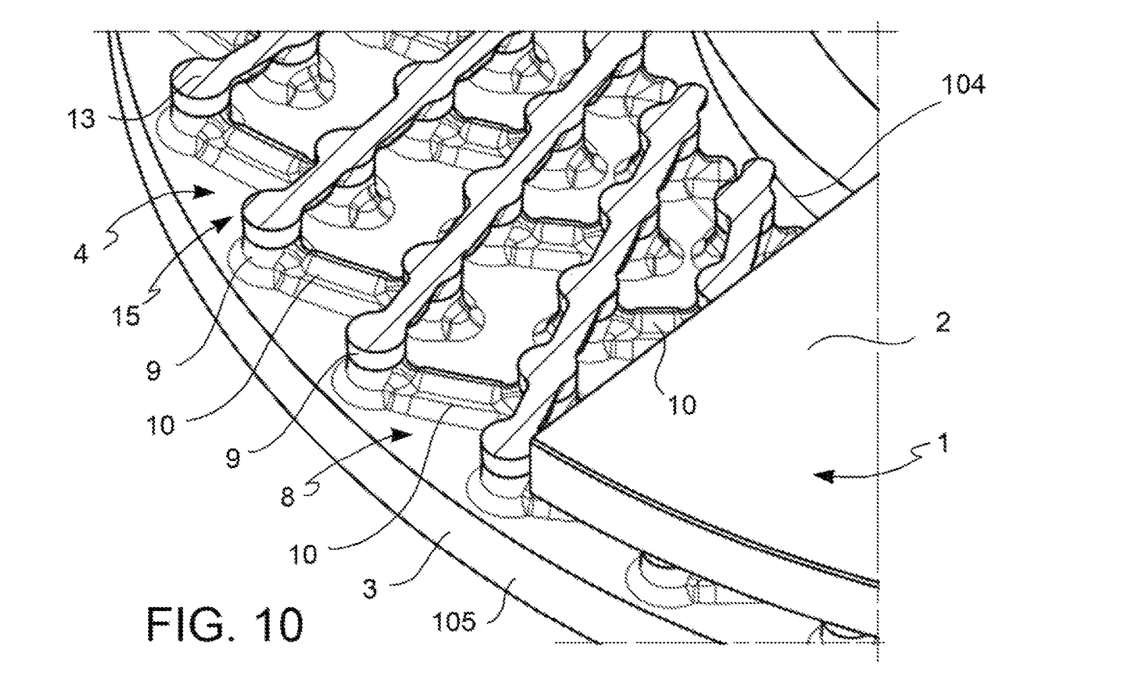
FIG. 10 shows a partially cross-sectioned axonometric view of a detail of the disc in FIG. 7.
Figure 11:
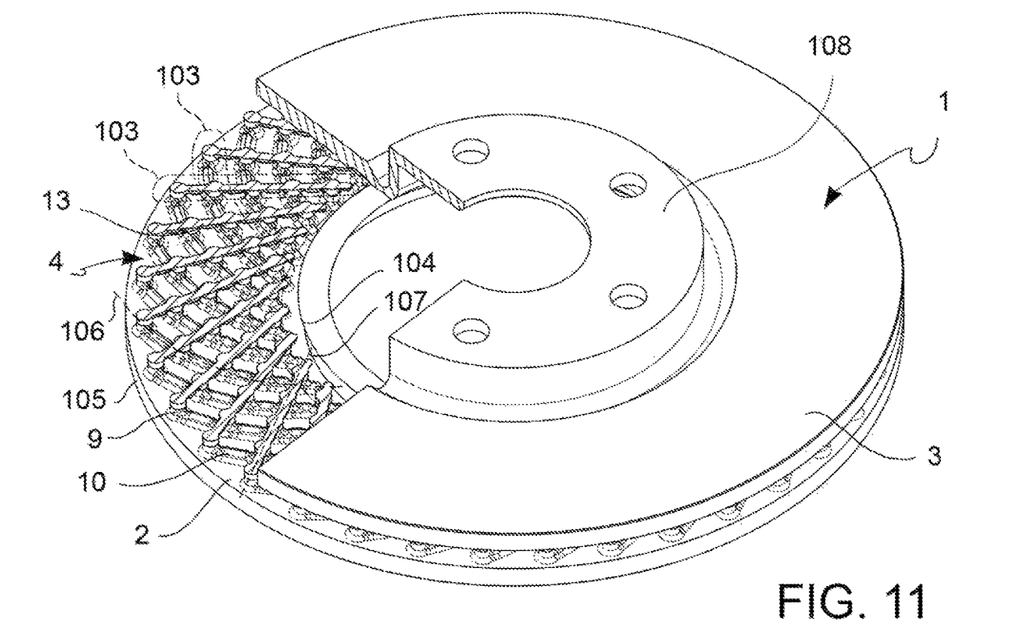
FIG. 11 depicts an axonometric view of a ventilated disc according to a third embodiment, partially cross sectioned along a plane parallel to a braking surface, arranged inside the gap and substantially slightly displaced from the inner surface of the sectioned plate.
Figure 12:
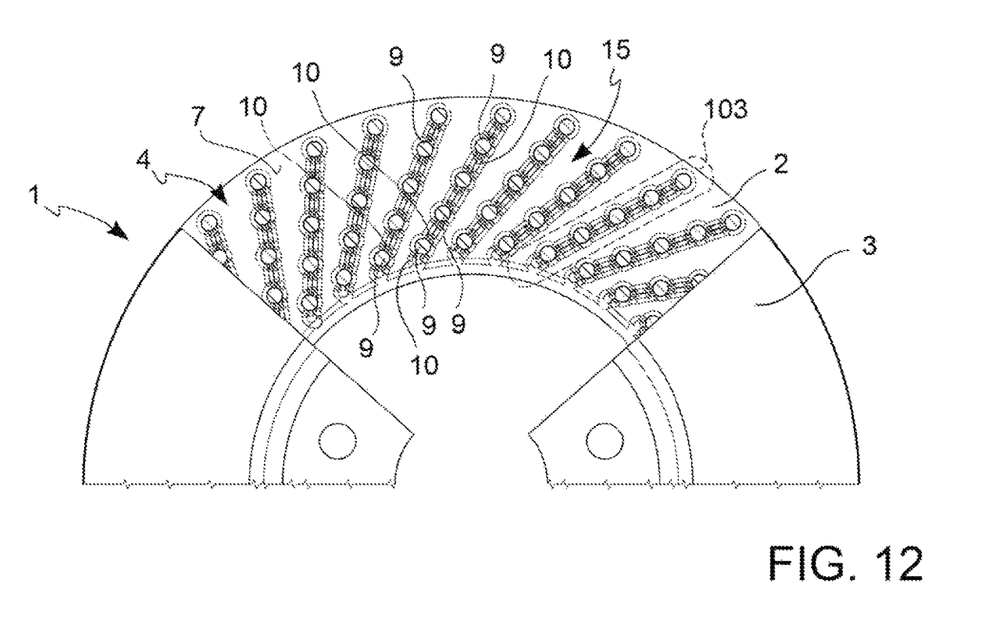
FIG. 12 depicts an axial view of the disc in FIG. 11, partially cross sectioned on a plane coinciding with the gap middle plane.
Figure 13:
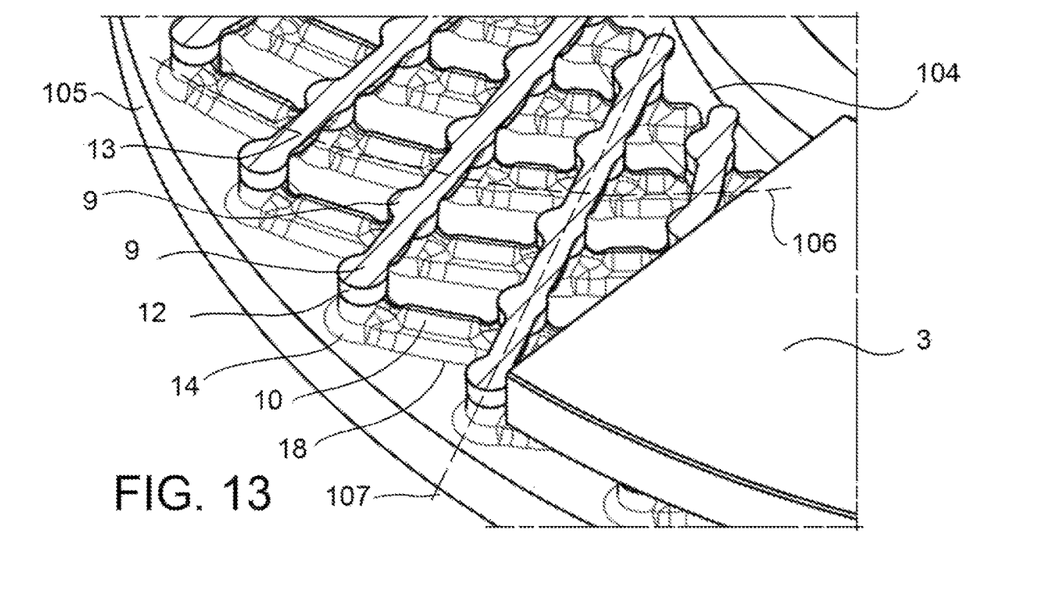
FIG. 13 shows a partially cross-sectioned axonometric view of a detail of the disc in FIG. 11.
Figure 14:
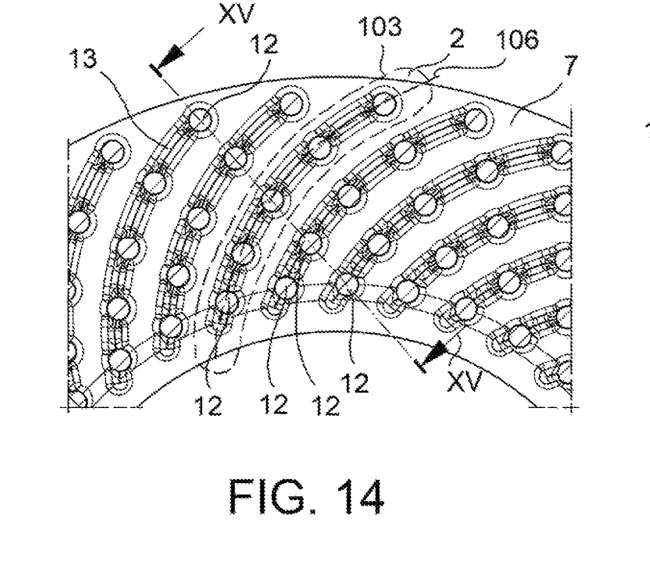
FIG. 14 shows a detail in FIG. 4.
Figure 15:
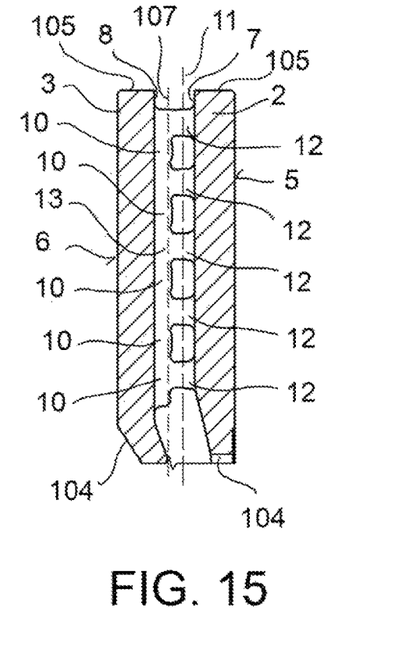
FIG. 15 depicts a local section of the disc in FIG. 14, according to line XV-XV in FIG. 14.
Figure 16:
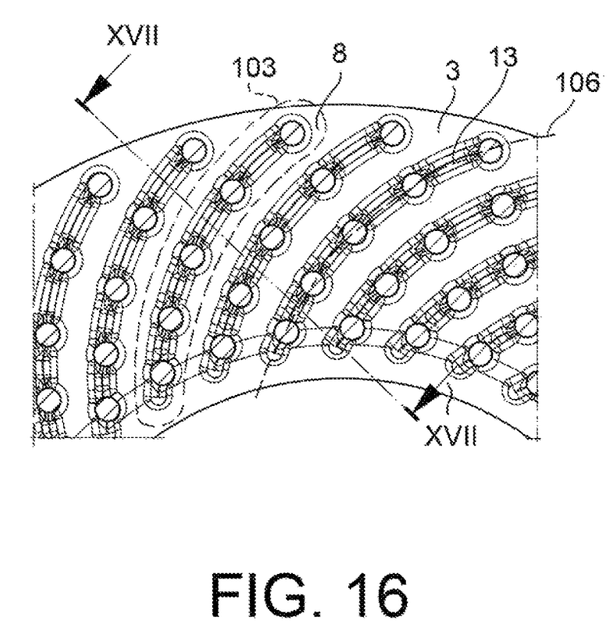
FIG. 16 shows a detail in FIG. 4.
Figure 17:
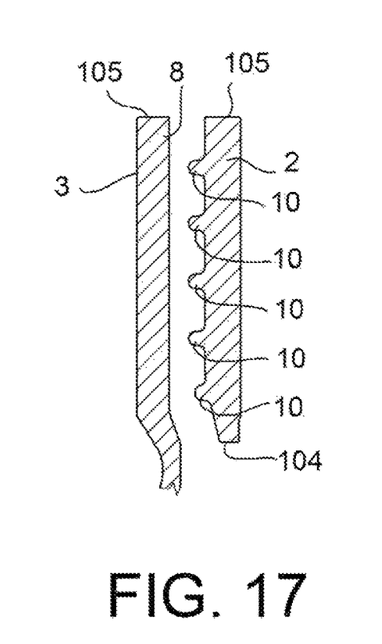
FIG. 17 depicts a local section of the disc in FIG. 16, according to line XVII-XVII in FIG. 16.

With reference to the aforesaid figures and according to a general embodiment, a ventilated braking band 100 for a ventilated brake disc 1 defines an axial direction A-A coinciding with the axis of rotation C of the ventilated brake disc 1, a radial direction R-R orthogonal to the axial direction A-A, and a tangential or circumferential direction C-C orthogonal to both the axial direction A-A and the radial direction R-R.

Said ventilated braking band 100 comprises a first plate 2 and a second plate 3, placed side-by-side and coaxial to the same axial direction A-A.

Said first plate 2 and said second plate 3 are mutually spaced apart in axial direction A-A so as to delimit a gap 4 therebetween.

Said first plate 2 comprises a first braking surface 5 suitable for facing at least a first brake pad 101 of a brake caliper which can be associated with said ventilated braking band 100.

Said first plate 2 comprises at least a first inner surface 7 facing said second plate 3, and in which said first inner surface 7 is substantially parallel to said first braking surface 5.

Said second plate 3 comprises a second braking surface 6 parallel and opposed to said first braking surface 5, so as to be suitable for facing at least a second brake pad 102 opposite to said first brake pad of said brake caliper which can be associated with said ventilated braking band 100.

Said second plate 3 comprises a second inner surface 8 facing said first plate 2, and in which said second inner surface 8 is substantially parallel to said second braking surface 6.

Said ventilated braking band 100 comprises connecting elements 9 which extend in an axial direction A-A between said first inner surface 7 and said second inner surface 8, thus connecting together said first plate 2 and said second plate 3.

Said ventilated braking band 100 comprises protrusions 10 which project from a plate 2, 3 in said gap 4 without reaching the faced plate 3, 2.

Each of said protrusions 10 connects together at least two separate connecting elements 9.

Some of said protrusions 10 which project in said gap from one of said first or second plate 2, 3, form a protrusion group 103.

Said protrusion group 103 is aligned to form a continuous or interrupted protrusion group path 106; 107.

According to one embodiment, not necessarily provided, said continuous or interrupted protrusion group 106; 107 develops from the proximity of the radially inner edge 104 to the proximity of the radially outer edge 105 of plate 2; 3.

Said protrusion group 103 projects from both plates 2, 3, thus forming at least a first and a second protrusion group path 106, 107.

Advantageously, the projections of said first and second protrusion group path 106, 107 cross one another on a plane parallel to the first or second braking surface 5, 6.

According to one embodiment, the projections of said first and second protrusion group path 106, 107 cross one another on a plane parallel to the first or second braking surface 5, 6 so as to avoid being parallel to one another.

According to one embodiment, said connecting elements 9, said first inner surface 7 and said second inner surface 8 at least partly delimit ventilation channels 15 inside said gap 4.

According to one embodiment, said ventilation channels 15 are suitable for conveying a fluid current flow for cooling said ventilated braking band 100.

According to one embodiment, the middle plane of said fluid current flow defines a gap middle plane 11.

According to one embodiment, said connecting elements 9 have a substantially circular or oval or rhomboidal section in said gap middle plane 11, thus forming connecting columns or pegs 12.

According to one embodiment, said connecting elements 9 have a substantially elongated section in said gap middle plane 11, according to a main extension direction, thus forming fins 13.

According to one embodiment, said fins 13 substantially extend along said first or second protrusion group path.

According to one embodiment, said protrusion group 103, together with said connecting elements 9 to which it is connected, form a module repeating in said gap 4, which is spaced apart in a circumferential direction C-C.

According to one embodiment, said protrusion group 103, together with said connecting elements 9 to which it is connected, form a module repeating in said gap 4, which is equally spaced apart in a circumferential direction C-C.

According to one embodiment, said first or second protrusion group path 106, 107 extends in said gap 4 along a curved line.

According to one embodiment, said first or second protrusion group path 106, 107 extends in said gap 4 along a straight line.

According to one embodiment, said first or second protrusion group path 106, 107 extends in said gap 4 along a straight line tilted by a predetermined angle A with respect to a radial direction R-R.

According to one embodiment, said first or second protrusion group path 106, 107 extends in said gap 4 in a continuous way thus avoiding interruptions or discontinuities which separate the protrusions 10 of the protrusion group 103 from one another with a length of a first or second inner surface 7, 8.

According to one embodiment, said first or second protrusion group path 106, 107 extends in said gap 4 in a discontinuous way comprising interruptions or discontinuities which separate at least some of the protrusions 10 of the protrusion group 103 with a length of first or second inner surface 7, 8.

According to one embodiment, the connecting element 9 has a connecting foot 14 of the connecting element in its connecting portion to the inner surface 7, 8 of plate 2, 3.

According to one embodiment, said connecting foot 14 enlarges the area which connects and puts into contact the connecting element with the inner surface 7, 8.

According to one embodiment, said connecting foot 14 of the connecting element is connected by a foot fitting 17 with said connecting element and with said inner surface 7, 8.

According to one embodiment, said connecting element 9 has a rounded connecting element outer surface 20.

According to one embodiment, protrusion 10 has a protrusion connecting foot 18 in its connecting portion to the inner surface 7; 8 of plate 2; 3.

According to one embodiment, said connecting foot 18 enlarges the area which connects and puts into contact protrusion 10 with the inner surface 7; 8.

According to one embodiment, said protrusion connecting foot 18 is connected by a protrusion foot fitting 19 to said inner surface 7; 8.

According to one embodiment, said protrusion 10 has a rounded protrusion outer surface 16.

According to one embodiment, at least one protrusion group path 106, 107 connects with connecting elements 9 being in a number ranging from three to eight connecting elements.

According to one embodiment, at least one protrusion group path 106, 107 connects with a plurality of connecting elements 9, for example from 3 to 8.

According to one embodiment, at least one protrusion group path 106, 107 connects with five connecting elements 9.

According to one embodiment, at least one protrusion group path 106 or 107 intersects separate protrusion group paths 107 or 106 being in a number ranging from four to eight paths.

According to one embodiment, at least one protrusion group path 106 or 107 intersects five separate protrusion group paths 107 or 106.

According to one embodiment, at least one protrusion group path 106 or 107 intersects at least one separate protrusion group path 107 or 106. Said protrusion group path 106 or 107 extends in said gap 4 in a continuous way, thus avoiding interruptions or discontinuities which separate the protrusions 10 of the protrusion group 103 from one another with a length of first or second inner surface 7, 8, while said separate protrusion group path 107 or 106 extends in said gap 4 in a discontinuous way comprising interruptions or discontinuities which separate at least some of the protrusions 10 of the protrusion group 103 with a length of first or second inner surface 7, 8.

According to one embodiment, at least one protrusion group path 106 or 107 intersects at least one separate protrusion group path 107 or 106. Said protrusion group path 106 or 107 extends in said gap 4 along a straight path and said separate protrusion group path 107 or 106 extends in said gap 4 along a curved path.

According to one embodiment, said first plate 2 is connected with said second plate 3 by at least one connecting element 9 arranged in the proximity of the plate radially inner edge 104.

Said at least one connecting element 9 connects with at least one protrusion 10 which extends without connecting with an adjacent connecting element 9.

The present invention also relates to a ventilated brake disc 1 comprising a ventilated braking band 100 as defined in any one of the embodiments described above, and a connecting bell 108 for connecting disc 1 with a hub or a hub holder of a vehicle.

A person skilled in the art, with the purpose of meeting contingent and specific needs, can make numerous changes and variants to the assembly according to the invention, moreover all contained within the scope of protection of the invention, which is defined by the following claims.

Due to the embodiments described, the turbulent cooling flow status may be increased, thus allowing for example the cooling air to flow over the protrusions which do not block the whole axial height of the gap, passing from a cooling channel delimited by a group of connecting elements to an adjacent one, and increasing the flow turbulence in the passage.

The intersection of at least two groups of protrusions extending from opposite plates create a labyrinth in the gap but never an occlusion for the air which remains free to circulate also in a more tortuous path. According to one embodiment, the connecting elements are pegs having a circular or oval or diamond-shaped cross section or section on a discharge middle plane or gap middle plane 11 which are capable of minimizing the volume which occludes the ventilation channel 15 formed in gap 4, and simultaneously the crossed protrusions create partial obstacles to the flow.

The air flow travelling through the gap from the inner edge of the plates 104 encounters continuous obstacles but few occlusions given by the pegs, especially protrusions which extend from the opposite plates extending crossed with one another, obstacles which deviate the air flow in a circumferential but also in an axial direction, thus forming a tortuous path which interrupts the streamlining flow, making it turbulent and even more effective in extracting heat from the brake disc.

REFERENCES 1 ventilated brake disc
2 first plate
3 second plate
4 gap
5 first braking surface
6 second braking surface
7 first inner surface
8 second inner surface
9 connecting elements
10 protrusions
11 gap middle plane
12 pegs
13 fins
14 connecting foot of the connecting element
15 ventilation channels
16 protrusion surface
17 foot fitting of the connecting element
18 protrusion connecting foot
19 foot fitting of the protrusion
20 connecting element outer surface
100 Ventilated braking band
101 first brake pad
102 second brake pad
103 protrusion group
104 plate radially inner edge
105 plate radially outer edge
106 first protrusion group path
107 second protrusion group path
108 connecting bell
C-C tangential or circumferential direction
R-R radial direction
A-A axial direction
C axis of rotation of the brake disc

The invention claimed is:

1. A ventilated braking band for a ventilated brake disc defining an axial direction, coinciding with the axis of rotation of the ventilated brake disc, a radial direction, orthogonal to the axial direction, and a tangential or circumferential direction, orthogonal to both the axial direction, and the radial direction:
said ventilated braking band comprises a first plate and a second plate, coaxial to the same axial direction;
said first plate and said second plate are mutually spaced apart in the axial direction so as to delimit a gap therebetween; wherein
said first plate comprises a first braking surface, adapted to face at least a first brake pad of a brake caliper which can be associated with said ventilated braking band; and wherein
said first plate comprises at least a first inner surface, facing said second plate, and wherein said first inner surface is substantially parallel to said first braking surface; and wherein
said second plate comprises a second braking surface, parallel and opposed to said first braking surface, so as to be adapted to face at least a second brake pad, opposite to said first brake pad of said brake caliper which can be associated with said ventilated braking band; and wherein
said second plate comprises a second inner surface, facing said first plate, and wherein said second inner surface is substantially parallel to said second braking surface; and wherein
said ventilated braking band comprises connecting elements extending in the axial direction between said first inner surface and said second inner surface, connecting together said first plate and said second plate; and wherein
said ventilated braking band comprises protrusions projecting from said first and second plates in said gap, without reaching the corresponding faced plate; and wherein
each of said protrusions connects together at least two separate connecting elements; and wherein
some of said protrusions, projecting in the gap from one of said first or second plate, form a protrusion group; and wherein
said protrusion group form a continuous or interrupted first protrusion group path, developing from the proximity of a radially inner edge to the proximity of a radially outer edge of said first and second plates; and wherein
said protrusion group projects from both plates forming at least said first and a second protrusion group path;
wherein the projections of said first and second protrusion group in a plane parallel to the first or second braking surface cross each other, creating a tortuous path for the ventilation of air.

2. The ventilated braking band, according to claim 1, wherein
said connecting elements, said first inner surface and said second inner surface at least partially delimit ventilation channels inside said gap, and wherein
said ventilation channels are adapted to convey a fluid current flow for cooling said ventilated braking band; and wherein
a middle plane of said fluid current flow defines a gap middle plane; and wherein
said connecting elements have a substantially circular or oval or rhomboidal section in said gap middle plane forming connecting columns or pegs; and/or wherein
said connecting elements have a substantially elongated section in said gap middle plane according to a main extension direction forming fins; and/or wherein
said fins substantially extend along said first or second protrusion group path.

3. The ventilated braking band, according to claim 1, wherein
said protrusion group, together with said connecting elements to which it is connected, forms a module repeating in said gap spaced apart in a circumferential direction; and/or wherein
said protrusion group, together with said connecting elements to which it is connected, forms a module repeating in said gap equally spaced apart in circumferential direction.

4. The ventilated braking band, according to claim 1, wherein
said first or second protrusion group path extends in said gap along a curved line; or wherein
said first or second protrusion group path extends in said gap along a straight line; or wherein said first or second protrusion group path extends in said gap along a straight line tilted with respect to a radial direction by a predetermined angle.

5. The ventilated braking band, according to claim 1, wherein
said first or second protrusion group path extends in said gap in a continuous way thus avoiding interruptions or discontinuities separating the protrusions of the protrusion group from one another with a length of a first or second inner surface; or wherein
said first or second protrusion group path extends in said gap in a discontinuous way comprising interruptions or discontinuities separating at least some of the protrusions of the protrusion group with a length of a first or second inner surface.

6. The ventilated braking band, according to claim 1, wherein
a connecting element has a connecting foot of the connecting element in a connecting portion to an inner surface of one of the first and second plates; said connecting foot enlarges an area which connects and puts into contact the connecting element with the inner surface; and/or wherein
said connecting foot of the connecting element is connected by a foot fitting with said connecting element and with said inner surface; and/or wherein
said connecting element has a rounded connecting element outer surface; and/or wherein
a protrusion has a protrusion connecting foot in a connecting portion to the inner surface of one of the first and second plates; said connecting foot enlarges an area which connects and puts into contact the protrusion with the inner surface; and/or wherein
said protrusion connecting foot is connected by a protrusion foot fitting to said inner surface; and/or wherein
said protrusion has a rounded protrusion outer surface.

7. The ventilated braking band, according to claim 1, wherein
at least a protrusion group path connects with connecting elements being in a number ranging from three to eight; and/or wherein
at least a protrusion group path connects with five connecting elements; and/or wherein
at least one protrusion group path intersects separate protrusion group paths being in a number ranging from three to eight; and/or wherein
at least one protrusion group path intersects five separate protrusion group paths.

8. The ventilated braking band, according to claim 1, wherein
at least one protrusion group path intersects at least one separate protrusion group path; and wherein
said protrusion group path extends in said gap in a continuous way thus avoiding interruptions or discontinuities separating the protrusions of the protrusion group from one another with a length of first or second inner surface; and wherein
said separate protrusion group path extends in said gap in a discontinuous way comprising interruptions or discontinuities separating at least some of the protrusions of the protrusion group with a length of first or second inner surface; and/or wherein
at least one protrusion group path intersects at least one separate protrusion group path; and wherein
said protrusion group path extends in said gap along a straight path; or wherein
said separate protrusion group path extends in said gap along a curved path.

9. The ventilated braking band, according to claim 1, wherein
said first plate is connected with said second plate by at least a connecting element arranged in the proximity of the radially inner edge of each plate, and wherein
said at least one connecting element connects with at least one protrusion which extends without connecting with an adjacent connecting element.

10. The ventilated brake disc comprising a ventilated braking band as defined in claim 1, and a connecting bell for connecting the disc with a hub or a vehicle door.

* * * * *